US012790484B2

(12) United States Patent
Kim et al.

(10) Patent No.: US 12,790,484 B2
(45) Date of Patent: Nov. 10, 2026

(54) POLYCARBONATE RESIN COMPOSITION FOR 3D PRINTING HAVING EXCELLENT SHAPE RETENTION ABILITY AND INTERFACIAL ADHESION, AND PELLET AND FILAMENT FOR 3D PRINTING COMPRISING SAME

(71) Applicant: SAMYANG CORPORATION, Seoul (KR)

(72) Inventors: Tae Geon Kim, Daejeon (KR); Sang Hyun Park, Daejeon (KR); Byeong Jun Lee, Daejeon (KR); Jun Haeng Lee, Seoul (KR); Jong Seong Yim, Nonsan-si (KR); Jung Hwan Cho, Daejeon (KR); Si Uk Cheon, Suwon-si (KR); Sun Chul Jin, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 673 days.

(21) Appl. No.: 18/268,732

(22) PCT Filed: Dec. 22, 2021

(86) PCT No.: PCT/KR2021/019668
§ 371 (c)(1),
(2) Date: Jun. 21, 2023

(87) PCT Pub. No.: WO2022/139494
PCT Pub. Date: Jun. 30, 2022

(65) Prior Publication Data

US 2024/0301202 A1 Sep. 12, 2024

(30) Foreign Application Priority Data

Dec. 22, 2020 (KR) ........................ 10-2020-0181025

(51) Int. Cl.
*C08L 69/00* (2006.01)
*B33Y 70/00* (2020.01)
(Continued)

(52) U.S. Cl.
CPC ............... *C08L 69/00* (2013.01); *B33Y 70/00* (2014.12); *C08J 3/22* (2013.01); *C08K 3/04* (2013.01);
(Continued)

(58) Field of Classification Search
CPC ......... C08L 69/00; C08J 3/22; C08J 2369/00; C08J 2467/02; C08K 3/04; B33Y 70/00
(Continued)

(56) References Cited

U.S. PATENT DOCUMENTS

| | | |
|---|---|---|
| 2,999,835 A | 9/1961 | Goldberg |
| 3,028,365 A | 4/1962 | Schnell et al. |

(Continued)

FOREIGN PATENT DOCUMENTS

| | | |
|---|---|---|
| JP | 2019167498 A * | 10/2019 |
| JP | 2020-179593 A | 11/2020 |

(Continued)

OTHER PUBLICATIONS

International Search Report (PCT/ISA/210) issued in PCT/KR2021/019668 mailed on Apr. 6, 2022.

*Primary Examiner* — Ruiyun Zhang
(74) *Attorney, Agent, or Firm* — Birch, Stewart, Kolasch & Birch, LLP

(57) ABSTRACT

The present invention relates to: a polycarbonate resin composition that is for 3D printing and has excellent shape retention ability and interfacial adhesion; and a pellet for 3D printing and filament for 3D printing, wherein the pellet and filament contain the polycarbonate resin composition. More specifically, the present invention relates to a polycarbonate
(Continued)

resin composition for 3D printing, and a pellet and a filament that are for 3D printing and comprise the polycarbonate resin composition, wherein the polycarbonate resin composition comprises a specific combination of a polycarbonate (PC) resin, a polybutylene terephthalate (PBT) resin, a carbon black master batch, and a carbon fiber, retains the excellent mechanical properties of the polycarbonate resin, and has an excellent balance of particular properties, such as shape retention ability and interfacial adhesion, required of 3D printing filaments.

9 Claims, 1 Drawing Sheet

(51) Int. Cl.
*C08J 3/22* (2006.01)
*C08K 3/04* (2006.01)

(52) U.S. Cl.
CPC ........ *C08J 2369/00* (2013.01); *C08J 2467/02* (2013.01)

(58) Field of Classification Search
USPC .......................................................... 524/496
See application file for complete search history.

(56) References Cited

U.S. PATENT DOCUMENTS

| | | | | |
|---|---|---|---|---|
| 3,153,008 | A | 10/1964 | Fox | |
| 3,334,154 | A | 8/1967 | Kim | |
| 2011/0207846 | A1 * | 8/2011 | Monden | C08L 69/00 523/134 |
| 2016/0312022 | A1 | 10/2016 | Niessner et al. | |
| 2021/0163735 | A1 | 6/2021 | Jin et al. | |

FOREIGN PATENT DOCUMENTS

| | | | |
|---|---|---|---|
| KR | 10-2016-0101997 | A | 8/2016 |
| KR | 10-2020-0023659 | A | 3/2020 |
| KR | 10-2020-0066480 | A | 6/2020 |

* cited by examiner

【Figure 1】
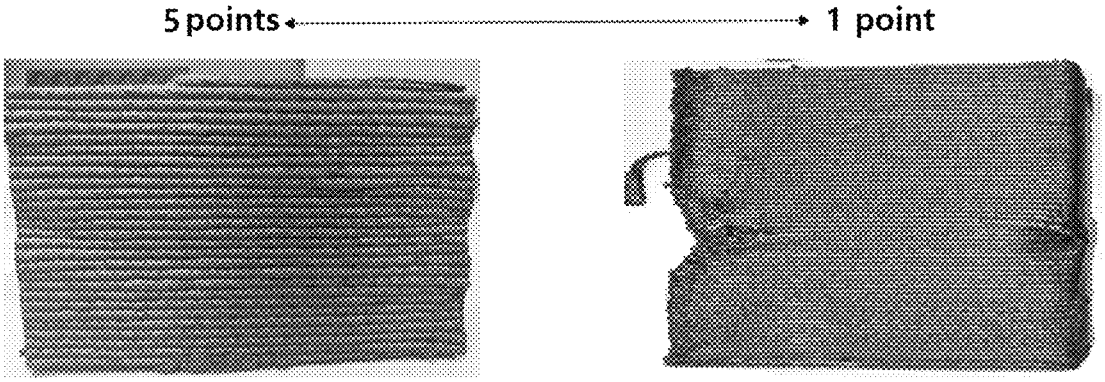
【Figure 2】
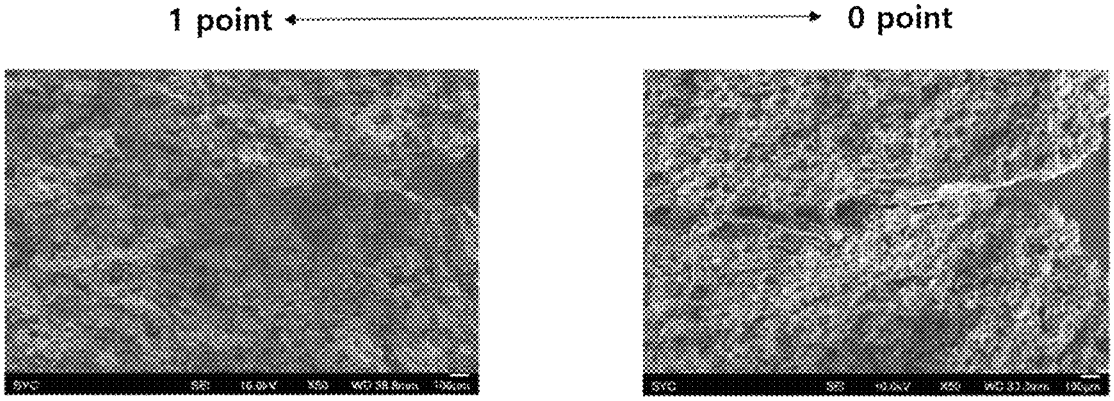

POLYCARBONATE RESIN COMPOSITION FOR 3D PRINTING HAVING EXCELLENT SHAPE RETENTION ABILITY AND INTERFACIAL ADHESION, AND PELLET AND FILAMENT FOR 3D PRINTING COMPRISING SAME

Polycarbonate resin composition for 3d printing having excellent shape retention ability and interfacial adhesion, and pellet and filament for 3d printing comprising same

TECHNICAL FIELD

The present invention relates to a polycarbonate resin composition for 3D printing having excellent shape retention and interfacial adhesion, and a pellet and a filament for 3D printing comprising the same, and more specifically, to a polycarbonate resin composition for 3D printing comprising a specific combination of polycarbonate (PC) resin, polybutylene terephthalate (PBT) resin, carbon black master batch and carbon fiber, which maintains the excellent mechanical properties of the polycarbonate resin, while providing an excellent balance of certain properties required in 3D printing materials such as shape retention and interfacial adhesion, and a pellet and a filament for 3D printing comprising the same.

BACKGROUND ART

The output method of 3D printing varies depending on its use, but the most popular output method in industry and home is the material extrusion method in consideration of equipment price, material supply and demand, and output difficulty. The material extrusion method is a method of melting and stacking materials provided in the form of filaments in a nozzle. Resins for 3D printing filaments used in this method include polylactic acid (PLA), acrylonitrile-butadiene-styrene (ABS), polycarbonate (PC) and polyimide (PI), etc.

Conventional 3D printers are composed of an extruder for supplying filaments, a hot-end nozzle for melting and spraying filaments, and the like. The filament supplied through the extruder is melted by the heater of the hot-end nozzle and ejected as beads, and the hot-end nozzle moves in 3-axis directions to stack the beads to create a three-dimensional object.

In order for a 3D article to have an appropriate quality, it is important to have the characteristics of a material capable of maintaining a constant printing quality. In particular, shape retention and interfacial adhesion are important as factors that determine printing quality. Shape retention refers to the characteristics of stacking beads ejected through a nozzle while maintaining the discharged circular shape as it is (not being crushed into an ellipse) when the beads are stacked in layers and the characteristics of maintaining the shape after three-dimensional lamination.

Among these, the most commonly used resin for 3D printing filaments is polylactic acid resin. Polylactic acid resin does not require expensive printing equipment because it does not smell during printing and can be printed at a relatively low temperature. However, since polylactic acid resin itself has poor mechanical properties, there is a need for a resin for 3D printing filaments capable of exhibiting excellent mechanical properties such as high strength while being capable of printing at a relatively low temperature, such as polylactic acid resin.

Polycarbonate resin is an engineering plastic with excellent mechanical properties, thermal properties and dimensional stability, and is used in various industrial fields. However, when a polycarbonate resin is used as a resin for a 3D printing filament, a collapse phenomenon may occur, and a decrease in stiffness may occur due to weak adhesion between interfaces.

Therefore, it is necessary to develop a polycarbonate resin composition for 3D printing filament that is excellent in all specific physical properties required for 3D printing filament, such as shape retention and interfacial adhesion.

CONTENTS OF THE INVENTION

Problems to be Solved

The purpose of the present invention is to provide a polycarbonate resin composition for 3D printing which maintains the excellent mechanical properties of the polycarbonate resin, while providing an excellent balance of certain properties required in 3D printing materials such as shape retention and interfacial adhesion, and a pellet and a filament for 3D printing comprising the same.

TECHNICAL MEANS

In order to achieve the technical purpose, the present invention provides a resin composition for 3D printing, comprising (1) 62 to 76 parts by weight of polycarbonate resin, (2) 1 to 11 parts by weight of polybutylene terephthalate resin, (3) 1 to 9.5 parts by weight of carbon black master batch, and (4) 11 to 25 parts by weight of carbon fiber, based on 100 parts by weight of the total composition.

In another aspect, the present invention provides a pellet for 3D printing comprising the polycarbonate resin composition of the present invention.

In another aspect, the present invention provides a filament for 3D printing comprising the polycarbonate resin composition of the present invention.

Effect of the Invention

The polycarbonate resin composition of the present invention has excellent interfacial adhesion while maintaining excellent mechanical properties inherent in the polycarbonate resin. Therefore, during 3D printing, it has excellent printability and excellent shape retention, so that collapse does not occur, and interfacial adhesion is excellent to prevent a decrease in stiffness, so that it can be suitably used as a pellet or a filament for 3D printing.

BRIEF DESCRIPTION OF THE FIGURES

FIG. 1 is a diagram illustrating a criterion for evaluating shape retention of a filament for 3D printing, and it corresponds to a higher score (up to 5 points) as no collapse occurs during 3D printing.

FIG. 2 is a diagram illustrating a criterion for evaluating interfacial adhesion of a filament for 3D printing, and it corresponds to a higher score (up to 5 points) when there is no gap between interfaces during 3D printing.

CONCRETE MODE FOR CARRYING OUT THE INVENTION

The present invention is explained in more detail below.

The resin composition for 3D printing of the present invention comprises (1) polycarbonate resin, (2) polybutylene terephthalate resin, (3) carbon black master batch and (4) carbon fiber. In addition, the resin composition for 3D printing of the present invention may optionally further comprise (5) one or more other additives.

(1) Polycarbonate (PC) Resin

As the polycarbonate resin that can be comprised in the resin composition for 3D printing of the present invention, an aromatic polycarbonate resin is preferable, but as long as it can implement the technical idea of the present invention, the type is not particularly limited thereto, and a thermoplastic aromatic polycarbonate resin which is commonly used in the art may be used.

In one embodiment of the present invention, the aromatic polycarbonate resin may be prepared from dihydric phenols, carbonate precursors and molecular weight modifiers, etc., and may comprise linear and/or branched polycarbonate homopolymers and polyester copolymers.

The dihydric phenols are one of the monomers consisting of the aromatic polycarbonate resin, and they may be represented by Formula 1 below.

[Formula 1]

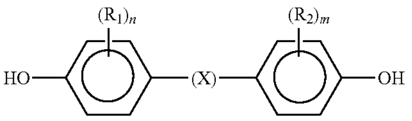

In Formula 1,

X may represent an alkylene group: a linear, branched or cyclic alkylene group without functional groups: or a linear, branched or cyclic alkylene group having at least one functional group selected from the group consisting of sulfide, ether, sulfoxide, sulfone, ketone, naphthyl or isobutylphenyl, and preferably X may represent a linear alkylene group having 1 to 10 carbon atoms, a branched alkylene group having 3 to 10 carbon atoms or a cyclic alkylene group having 3 to 10 carbon atoms, each of $R^1$ and $R^2$ may independently represent a halogen atom, a linear alkyl group having 1 to 20 carbon atoms, a branched alkyl group having 3 to 20 carbon atoms or a cyclic alkyl group having 3 to 20 carbon atoms, and each of n and m may independently represent an integer of 0 to 4.

A non-limiting example of the dihydric phenols may be selected from bis(4-hydroxyphenyl)methane, bis(4-hydroxyphenyl)phenylmethane, bis(4-hydroxyphenyl) naphthylmethane, bis(4-hydroxyphenyl)-(4-isobutylphenyl)methane, 1,1-bis(4-hydroxyphenyl) ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane, 2,2-bis(4-hydroxyphenyl)butane, 2,2-bis(4-hydroxyphenyl)pentane, 2,2-bis(4-hydroxyphenyl)hexane, 2,2-bis(4-hydroxyphenyl) nonane, 2,2-bis(3-methyl-4-hydroxyphenyl)propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, resorcinol, hydroquinone, 4,4'-dihydroxyphenyl ether[bis(4-hydroxyphenyl)ether], 4,4'-dihydroxy-2,5-dihydroxydiphenyl ether, 4,4'-dihydroxy-3,3'-dichlorodiphenyl ether, bis(3,5-dimethyl-4-hydroxyphenyl) ether, bis(3,5-dichloro-4-hydroxyphenyl)ether, 1,4-dihydroxy-2,5-dichlorobenzene, 1,4-dihydroxy-3-methylbenzene, 4,4'-dihydroxydiphenol[p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl)cyclododecane, 1,1-bis(4-hydroxyphenyl)butane, 1,1-bis(4-hydroxyphenyl) decane, 1,4-bis(4-hydroxyphenyl)propane, 1,4-bis(4-hydroxyphenyl)butane, 1,4-bis(4-hydroxyphenyl) isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl)methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol[bis(4-hydroxyphenyl)sulfone], bis(3,5-dimethyl-4-hydroxyphenyl)sulfone, bis(3-chloro-4-hydroxyphenyl)sulfone, bis(4-hydroxyphenyl)sulfide, bis(4-hydroxyphenyl)sulfoxide, bis(3-methyl-4-hydroxyphenyl)sulfide, bis(3,5-dimethyl-4-hydroxyphenyl)sulfide, bis(3,5-dibromo-4-hydroxyphenyl)sulfoxide, 4,4'-dihydroxy benzophenone, 3,3',5,5'-tetramethyl-4,4'-dihydroxy benzophenone, 4,4'-dihydroxy diphenyl, methylhydroquinone, 1,5-dihydroxynaphthalene and 2,6-dihydroxynaphthalene, but it is not limited thereto. Among them, the representative one is 2,2-bis(4-hydroxyphenyl)propane (bisphenol A). For other functional dihydric phenols, U.S. Pat. Nos. 2,999,835, 3,028,365, 3,153,008, 3,334,154 and 4,131,575, etc. may be referred to. The above dihydric phenol may be used alone or in combination of two or more of them.

The carbonate precursor is another monomer consisting of the aromatic polycarbonate resin, and non-limiting examples thereof include carbonyl chloride (phosgene), carbonyl bromide, bishaloformate, diphenyl carbonate or dimethyl carbonate. Preferably, carbonyl chloride (phosgene) can be used.

As the molecular weight modifier, a material already known in the art—that is, a monofunctional compound similar to a monomer used in preparing a thermoplastic aromatic polycarbonate resin—may be used. Non-limiting examples of the molecular weight modifier include phenol-based derivatives (e.g., para-isopropylphenol, para-tert-butylphenol (PTBP), para-cumylphenol, para-isooctylphenol, para-isononylphenol, etc.) and aliphatic alcohols, etc. Preferably, para-tert-butylphenol (PTBP) may be used.

The viscosity average molecular weight of the polycarbonate resin comprised in the resin composition of the present invention may be preferably 15,000 to 50,000, more preferably 16,000 to 30,000.

The filament composition for 3D printing of the present invention comprises 62 to 76 parts by weight of the polycarbonate resin based on 100 parts by weight of the total composition. If the content of the polycarbonate resin in the total 100 parts by weight of the composition is less than 62 parts by weight, there may be a problem in that the mechanical strength of the 3D printing product is lowered, and if it exceeds 76 parts by weight, collapse may occur.

More specifically, the content of the polycarbonate resin in the resin composition based on a total of 100 parts by weight of the resin composition for 3D printing of the present invention may be 62 parts by weight or more, 63 parts by weight or more, 64 parts by weight or more or 65 parts by weight or more, and may also be 76 parts by weight or less, 75 parts by weight or less, 74 parts by weight or less or 72 parts by weight or less. Preferably, the content of the polycarbonate resin in 100 parts by weight of the composition may be, for example, 62 to 76 parts by weight, more preferably 63 to 75 parts by weight, and still more preferably 65 to 72 parts by weight.

(2) Polybutylene Terephthalate (PBT) Resin

The polybutylene terephthalate resin comprised in the resin composition for 3D printing of the present invention is a polymer polycondensed with butane-1,4-diol and terephthalic acid or dimethyl terephthalate as monomers through direct esterification or transesterification.

In a preferred embodiment of the present invention, the melting temperature of the polybutylene terephthalate resin may be 215 to 235° C., more preferably 220 to 230° C. In addition, the intrinsic viscosity (IV) is preferably 0.45 to 1.6 dl/g, more preferably 0.80 to 1.3 dl/g.

The resin composition for 3D printing of the present invention comprises 1 to 11 parts by weight of the polybutylene terephthalate resin based on 100 parts by weight of the total composition. If the content of the polybutylene terephthalate resin in the total 100 parts by weight of the composition is less than 1 part by weight, it is difficult to expect improvement in the collapse of the 3D printed product, and if the content of the polybutylene terephthalate resin exceeds 11 parts by weight, the mechanical properties of the 3D printed product are lowered, and the interfacial adhesion can be reduced.

More specifically, the content of the polybutylene terephthalate resin in the resin composition based on the total 100 parts by weight of the resin composition for 3D printing of the present invention may be 1 part by weight or more, 2 parts by weight or more, 3 parts by weight or more or 4 parts by weight or more, and may be 11 parts by weight or less, 10.5 parts by weight or less, 10 parts by weight or less, 9.5 parts by weight or less, 9 parts by weight or less or 8 parts by weight or less. Preferably, the content of the polybutylene terephthalate resin in 100 parts by weight of the composition may be, for example, 1 to 11 parts by weight, more preferably 2 to 10 parts by weight, and even more preferably 3 to 8 parts by weight.

(C) Carbon Black Master Batch

The carbon black master batch refers to a mixture in which carbon black is dispersed in a thermoplastic resin, preferably in the polycarbonate resin described above. By using a carbon black master batch in which carbon black is dispersed in a polycarbonate resin, the carbon black is easily dispersed and light resistance can be effectively improved.

The carbon black contained in the carbon black master batch is not particularly limited, and for example, ketjen black, acetylene black, channel black or a combination thereof may be used. The particle size of the carbon black is preferably in the range of 10 nm to 40 nm. The nitrogen adsorption specific surface area (NSA) of the carbon black is not particularly limited, but it is preferably 150 to 250 $m^2/g$, more preferably 180 to 240 $m^2/g$. Here, the nitrogen adsorption specific surface area (NSA) is a value obtained by measuring the amount of nitrogen adsorption on the surface of carbon black according to JIS K6217-2: 2001 "Part 2: Method for obtaining specific surface area—Nitrogen adsorption method—Single-point procedures."

The resin composition for 3D printing of the present invention comprises 1 to 9.5 parts by weight of the carbon black master batch based on 100 parts by weight of the total composition. If the content of the carbon black master batch in 100 parts by weight of the total composition is less than 1 part by weight, it is difficult to expect an effect of improving interfacial adhesion because the content of carbon black is too small, and if the content of the carbon black master batch exceeds 9.5 parts by weight, mechanical properties may be deteriorated.

More specifically, the content of the carbon black master batch in the resin composition based on 100 parts by weight of the total resin composition for 3D printing of the present invention may be 1 part by weight or more, 2 parts by weight or more, 3 parts by weight or more or 4 parts by weight or more, and may be 9.5 parts by weight or less, 9 parts by weight or less, 8.5 parts by weight or less, 8 parts by weight or less, 7 parts by weight or less or 6 parts by weight or less. Preferably, the content of the carbon black master batch in 100 parts by weight of the composition may be, for example, 1 to 9.5 parts by weight, more preferably 2 to 8 parts by weight, and even more preferably 4 to 6 parts by weight.

(D) Carbon Fiber

The carbon fibers can generally be classified according to their diameter, shape and degree of graphitization. These properties can be determined by the methods used to synthesize the carbon fibers. In the present invention, the carbon fiber is not particularly limited, but it may preferably be pitch or polyacrylonitrile (PAN)-based fiber, and it may be present in the composition in the form of a single filament or multi-filament. For example, co-weave, core/sheath, side-by-side, orange-type or matrix and fibril structures, etc. may be used alone or in combination with other types of fibers. In addition, the reinforcing composition of the carbon fiber can be used in the composition in the form of, for example, non-woven fibrous reinforcements such as rovings, woven fibrous reinforcing materials such as 0-90 degree Fabrics, continuous strand mats, chopped strand mats, tissues, papers and felts, or three-dimensional woven reinforcements such as preforms and braids.

Carbon fibers generally have a diameter of about 1 to 30 μm, and according to one embodiment of the present invention, the diameter of the fiber may be 2 to 20 μm, preferably 3 to 10 μm.

The resin composition for 3D printing of the present invention comprises 11 to 25 parts by weight of the carbon fiber based on 100 parts by weight of the total composition. If the carbon fiber content in the total 100 parts by weight of the composition is less than 11 parts by weight, the collapse phenomenon may not be improved, and if the carbon fiber content exceeds 25 parts by weight, extrusion processing may be difficult.

More specifically, the content of the carbon fiber in the resin composition based on 100 parts by weight of the total resin composition for 3D printing of the present invention may be 11 parts by weight or more, 12 parts by weight or more, 13 parts by weight or more or 15 parts by weight or more, and may be 25 parts by weight or less, 24 parts by weight or less, 23 parts by weight or less, 22 parts by weight or less, 21 parts by weight or less or 20 parts by weight or less. Preferably, the content of the carbon fibers in 100 parts by weight of the composition may be, for example, 11 to 25 parts by weight, more preferably 13 to 22 parts by weight, and even more preferably 15 to 20 parts by weight.

(E) Other Additives

In addition to the components (A), (B), (C) and (D) described above, the resin composition of the present invention may further comprise one or more other additives typically added to thermoplastic resin compositions for injection molding or extrusion molding. The resin composition of the present invention may comprise, for example, one or more additives selected from the group consisting of an inorganic particle, an antioxidant, a lubricant, an ultraviolet absorber, a light stabilizer, an impact modifier, a matting agent, a flame retardant or a mixture of two or more of the foregoing.

Specifically, as the inorganic particles, at least one selected from the group consisting of talc, whiskers, glass beads, glass flakes, glass fibers, carbon fibers, clay, kaolin, mica, calcium carbonate and barium sulfate may be used.

Specifically, as the antioxidant, a phenol-based antioxidant, a phosphite-based antioxidant, a thioester-based antioxidant or a mixture of two or more of the foregoing may be used.

Specifically, as the lubricant, a polyethylene-based lubricant, an ethylene-ester-based lubricant, an ethylene glycol-glycerin ester-based lubricant, a montan-based lubricant, an ethylene glycol-glycerin montanic acid ester-based lubricant or a mixture of two or more of the foregoing may be used.

The ultraviolet absorber is not particularly limited, and commercially available products may be used.

Specifically, as the light stabilizer, a benzotriazole-based compound, a hydroxyphenyltriazine-based compound, a pyrimidine-based compound, a cyanoacrylate-based compound or a mixture of two or more of the foregoing may be used.

As the impact modifier, one or more core-shell structure-copolymers selected from an acrylate-based copolymer, an ethylene-acrylate-based copolymer, a silicone-containing copolymer or a polyalkyl methacrylate-based copolymer can be used, but the impact modifier is not limited thereto. The impact modifier can perform stabilization of excellent and uniform physical properties by improving compatibility between thermoplastic resins in the composition or between components in the composition as well as the function of impact reinforcement.

Further, as a flame retardant, one or more compounds selected from a phosphate-based compound, a phosphonate-based compound, a polysiloxane, a phosphazene-based compound, a phosphinate-based compound or a melamine-based compound can be used as a substance that reduces combustibility, but it is not limited to. The matting agent may be an inorganic compound or an organic compound, wherein the inorganic compound may be silica, magnesium oxide, zirconia, alumina, titania, or a mixture of two or more of the foregoing, and the organic compound may be a cross-linked vinyl-based copolymer, wherein the monomer of the vinyl-based copolymer is one or more monomers selected from styrene, acrylonitrile, methyl (meth)acrylate, ethyl (meth)acrylate or butyl (meth)acrylate, etc.

The content of the other additives is not particularly limited, but it is any amount that may be used to add more functionality without compromising the intended properties of the filament composition for 3D printing of the present invention.

According to one embodiment of the present invention, the content of the other additive may be 0.1 to 10 parts by weight, preferably 0.5 to 10 parts by weight, more preferably 1 to 8 parts by weight, based on 100 parts by weight of the total composition of the present invention. If the content of the other additives in the total 100 parts of the composition is less than 0.1 parts by weight, the improvement effect of various functions by using the other additives may be insignificant, and if the content of the other additives is more than 10 parts by weight, the mechanical properties of the resin composition may be poor.

In another aspect, the present invention provides a pellet for 3D printing comprising the polycarbonate resin composition of the present invention.

In another aspect, the present invention provides a filament for 3D printing comprising the polycarbonate resin composition of the present invention.

The filament for 3D printing may be prepared by extrusion molding the resin composition of the present invention. Specifically, the filament for 3D printing may be produced by making pellets with the resin composition of the present invention and secondary processing (extrusion molding, etc.) of the pellets.

The present invention is explained in more detail through the following Examples and Comparative Examples. However, the scope of the present invention is not limited thereby in any manner.

Examples

The components used in the Examples and Comparative Examples are specifically as follows.

(A) Polycarbonate resin: bisphenol A linear polycarbonate with a viscosity average molecular weight of about 17,000

(B) Polybutylene terephthalate resin: polybutylene terephthalate with an intrinsic viscosity (IV) of 0.8 to 1.1 dl/g (C) Carbon black masterbatch: Woosung Chemical NB9086

(D) Carbon fiber: MITSUBISHI PYROFIL TR06UL (E) Other additives: an impact modifier, an antioxidant and a lubricant A thermoplastic resin composition was prepared by mixing a polycarbonate copolymer resin, a polybutylene terephthalate resin and a carbon black masterbatch with the components and contents of the Examples and Comparative Examples shown in Tables 1 and 2 below, using a mixer to mix well and disperse uniformly. Then, extrusion of the above-prepared thermoplastic resin composition was carried out using a 32-pie twin-screw extruder (L/D=40, 25 mm) at 260° C. to 280° C. and 200 rpm to 250 rpm, and carbon fiber was side-injected. Injection specimens were prepared using an injection machine with a clamping force of 100 tons to 200 tons under the same temperature conditions. In the case of injection specimens for measuring mechanical properties, injection specimens conforming to each ASTM standard were prepared so as to be suitable for measuring tensile strength and impact strength.

<Evaluation of Physical Properties>

(1) Tensile Strength

Evaluated according to ASTM D638.

(2) Flexural Strength and Flexural Modulus

Evaluated according to ASTM D790.

(3) Impact Strength

Evaluated according to ASTM D256 (1/8 inch thick, notch-Izod).

(4) Heat Deflection Temperature

According to ASTM D648, it was evaluated with a load of 18.6 $kg/cm^2$.

(5) Shape Retention (Collapse)

A 200 mm×100 mm square specimen was printed with a 3D printer at the corresponding output temperature. If the shape retention is insufficient, the printed object does not maintain the shape of a square and dents occur. By observing the place where the output product does not maintain the original shape and the dent phenomenon is the largest, we assigned 1 to 5 points according to the degree as shown below. (See FIG. 1.)

5 points: Less than 0.5 centimeter dented
4 points: 0.5 cm to 1.0 cm dented
3 points: 1.0 cm to 1.5 cm dented
2 points: 1.5 cm to 2.0 cm dented
1 point: More than 2.0 cm dented (6) Interfacial Adhesion A 200 mm×100 mm square specimen was printed with a 3D printer at the corresponding printing temperature. Afterward, the corners of the square specimen were observed with a five-location SEM. The phenomenon that can be distinguished because the interface between the resins is not perfectly adhered is called interfacial separation. If no interfacial separation was observed, a score of 0 was given, and if interfacial separation was observed, a score of 1 was given. A total of 5 locations were observed and summed up, and 0 to 5 points were assigned as follows. (See FIG. 2.)

5 points: No interfacial separation
4 points: 1 interfacial separation observed out of 5 locations
3 points: 2 interfacial separations observed out of 5 locations
2 points: 3 interfacial separations observed out of 5 locations
1 point: 4 interfacial separations observed out of 5 locations
0 points: 5 interfacial separations observed out of 5 locations

TABLE 1

| | Examples | | | | |
|---|---|---|---|---|---|
| Categories | 1 | 2 | 3 | 4 | 5 |
| (A) | 67 | 72 | 68 | 68 | 65 |
| (B) | 4 | 4 | 8 | 3 | 4 |
| (C) | 4 | 4 | 4 | 4 | 6 |
| (D) | 20 | 15 | 15 | 20 | 20 |
| (E) | 5 | 5 | 5 | 5 | 5 |
| Tensile strength | 1510 | 1410 | 1430 | 1520 | 1470 |
| Flexural strength | 1560 | 1470 | 1490 | 1580 | 1520 |
| Flexural modulus | 102600 | 88000 | 100300 | 103400 | 101200 |
| Impact strength | 8.1 | 8.8 | 7.6 | 8.2 | 7.8 |
| Heat deflection temperature | 102 | 103 | 97 | 103 | 100 |
| Interfacial adhesion | 5 | 5 | 5 | 5 | 5 |
| Shape retention (collapse) | 5 | 4 | 4 | 4 | 5 |

TABLE 2

| | Comparative Examples | | | | | |
|---|---|---|---|---|---|---|
| Categories | 1 | 2 | 3 | 4 | 5 | 6 |
| (A) | 71 | 61 | 77 | 82 | 71 | 59 |
| (B) | 4 | 4 | 4 | 4 | 0 | 12 |
| (C) | 0 | 10 | 4 | 4 | 4 | 4 |
| (D) | 20 | 20 | 10 | 5 | 20 | 20 |
| (E) | 5 | 5 | 5 | 5 | 5 | 5 |
| Tensile strength | 1520 | 1360 | 1150 | 970 | 1600 | 1250 |
| Flexural strength | 1600 | 1280 | 1400 | 1250 | 1650 | 1350 |
| Flexural modulus | 103400 | 94000 | 67550 | 46500 | 104000 | 82000 |
| Impact strength | 9.5 | 4.6 | 11 | 18 | 7.2 | 5.1 |
| Heat deflection temperature | 103 | 95 | 101 | 100 | 105 | 91 |
| Interfacial adhesion | 1 | 4 | 4 | 4 | 3 | 3 |
| Shape retention (collapse) | 4 | 4 | 3 | 2 | 1 | 5 |

The polycarbonate resin composition according to the present invention maintains the excellent mechanical properties inherent in polycarbonate resins, and at the same time, has excellent shape retention during 3D printing, no collapse phenomenon and excellent interfacial adhesion. As can be seen from Table 1 above, the resin compositions according to an embodiment of the present invention have improved interfacial adhesion and collapse phenomenon compared to the resin compositions presented in the Comparative Example, and have excellent balanced mechanical properties such as tensile strength, flexural strength, and impact strength. These polycarbonate resin compositions can be suitably used as materials for 3D printing.

On the other hand, as can be seen in Table 2, Comparative Example 1 indicates that the absence of carbon masterbatch results in poor interfacial adhesion. Conversely, Comparative Example 2 indicates that a higher carbon masterbatch content can result in property degradation.

Comparative Examples 3 and 4 show that collapse occurs due to the low content of carbon fiber.

Comparative Example 5 shows that the absence of polybutylene terephthalate resin slows down the solidification rate, resulting in collapse. In Comparative Example 6, it can be seen that the higher content of polybutylene terephthalate resin results in deterioration of physical properties and decreased interfacial adhesion.

The invention claimed is:

1. A resin composition for 3D printing, comprising (1) 65 to 72 parts by weight of polycarbonate resin, (2) 3 to 8 parts by weight of polybutylene terephthalate resin, (3) 4 to 6 parts by weight of carbon black master batch comprising 25% by weight of carbon black, and (4) 15 to 20 parts by weight of carbon fiber, based on 100 parts by weight of the total composition.

2. The resin composition for 3D printing according to claim 1, wherein the polycarbonate resin has a viscosity average molecular weight of 15,000 to 50,000.

3. The resin composition for 3D printing according to claim 1, wherein the polybutylene terephthalate resin has a melting temperature of 215 to 235° C. and an intrinsic viscosity (IV) of 0.45 to 1.6 dl/g.

4. The resin composition for 3D printing according to claim 1, wherein the carbon black master batch comprises the carbon black as particles having a particle size of 10 nm to 40 nm and a nitrogen adsorption specific surface area (NSA) of 150 to 250 $m^2/g$.

5. The resin composition for 3D printing according to claim 1, wherein the diameter of the carbon fiber is 1 to 30 μm.

6. The resin composition for 3D printing according to claim 1, further comprising at least one additive selected from the group consisting of an inorganic particle, an antioxidant, a lubricant, an ultraviolet absorber, a light stabilizer, an impact modifier, a matting agent, a flame retardant or a mixture thereof.

7. A pellet for 3D printing comprising the composition of claim 1.

8. A filament for 3D printing comprising the composition of claim 1.

9. The resin composition for 3D printing according to claim 1, wherein said polycarbonate resin is bisphenol A linear polycarbonate with a viscosity average molecular weight of about 17,000 and said polybutylene terephthalate resin is polybutylene terephthalate with an intrinsic viscosity (IV) of 0.8 to 1.1 dl/g.

* * * * *